Dec. 1, 1953      R. S. COFFMAN ET AL      2,661,121
SAFETY PRESSURE DEVICE
Filed Aug. 23, 1950

INVENTOR.
Robert S. Coffman
BY Howard N. Simms
Fishburn & Mullendore
ATTORNEYS

Patented Dec. 1, 1953

2,661,121

UNITED STATES PATENT OFFICE 2,661,121

SAFETY PRESSURE DEVICE

Robert S. Coffman and Howard N. Simms, Kansas City, Mo., assignors to Black, Sivalls & Bryson, Inc., Kansas City, Mo., a corporation of Delaware Application August 23, 1950, Serial No. 180,938

4 Claims. (Cl. 220—89)

This invention relates to a safety device of the type employing frangible diaphragms designed to rupture when a predetermined pressure differential occurs on the respective sides thereof.

It is desirable to protect such diaphragms on their exterior sides with a supplementary diaphragm that ruptures upon failure of the primary diaphragm. But when the primary diaphragm is holding corrosive fluids or subjected to fluctuating work pressures, pin holes and cracks develop, and these defects are not discernible because of the supplementary diaphragm.

It is therefore a principal object of the present invention to provide a safety device of this character with means for indicating leakage of fluid through the primary diaphragm so that the defective diaphragm may be removed and replaced with a new one.

Other objects of the invention are to provide a simple and inexpensive mounting for the primary and supplementary diaphragms; to provide a mounting whereby both diaphragms are simultaneously clamped in the safety device; to provide a simple and positive clamp adapted to grip and seal the marginal edges of the diaphragms without altering their calculated pressures; and to provide a safety device which may be installed as a replaceable unit.

In accomplishing these and other objects of the invention hereinafter pointed out, we have provided an improved structure, the preferred forms of which are illustrated in the acompanying drawing wherein.

Figure 1:
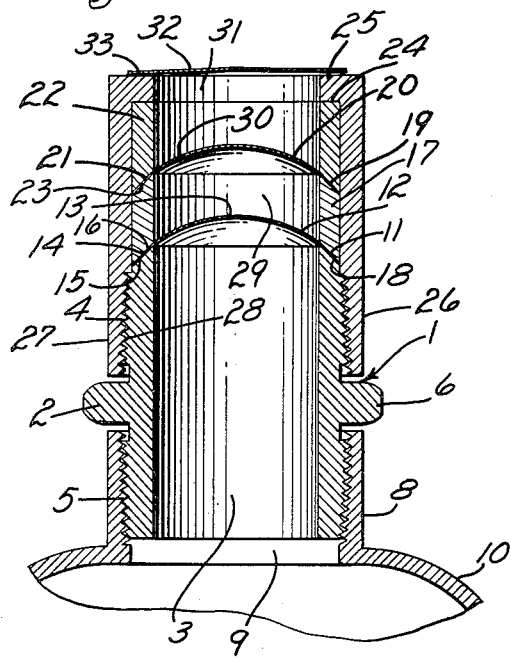
Fig. 1 is a vertical section through a safety device embodying the features of the present invention.
Figure 2:
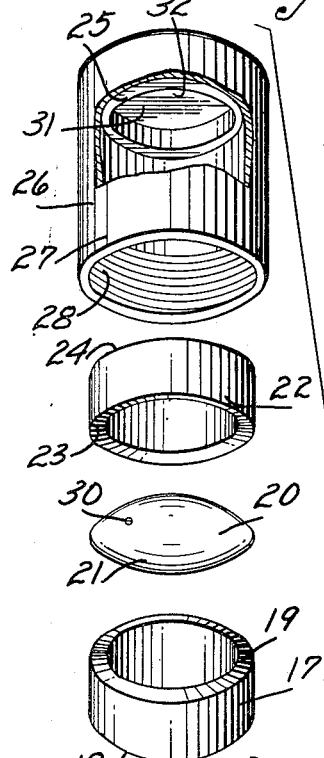
Fig. 2 is a perspective view of the parts of the safety device shown in disassembled spaced relation.

Referring more in detail to the drawings:

1 designates a safety device constructed in accordance with the present invention and which includes a body member 2 preferably in the form of a nipple providing flow passageway 3 and having externally threaded ends 4 and 5 on the respective sides of a flange 6. The flange 6 is preferably provided with wrench engaging faces 7 to facilitate turning of the body member within an internally threaded collar 8 that encircles a relief opening 9; for example, in a pressure vessel 10. The outer end of the body member is provided with an annular bevelled seat 11 that slopes outwardly and downwardly as best shown in Fig. 1.

Mounted on the seat 11 is a primary frangible diaphragm 12 that is of concavo-convex form to provide a dome shaped frangible portion 13 and a marginal portion 14 that forms a smooth continuation of the portion 13 and which flares outwardly at an angle corresponding with the bevel of the seat 11 to provide an annular seating face 15 on the concave side and a similar seating face 16 on the convex side adapted to be engaged by a spacer ring 17.

The spacer ring 17 forms a continuation of the flow passageway 3 and has bevelled ends forming an annular gripping face 18 for engaging the face 16 of the primary diaphragm and an annular seating face 19 similar to the seating face 11 for mounting the auxiliary or protective diaphragm 20 which preferably conforms in shape with the primary diaphragm 12 and has an annularly flaring marginal portion 21 engaging the seat 19 and which is clamped thereagainst by a clamping ring or sleeve 22.

The member 22 forms a continuation of the flow passageway and is of a diameter corresponding with the outer diameter of the spacer ring 17 as shown in Fig. 1. One end of the member 22 has an annularly bevelled face 23 engaging the upper face of the marginal portion 21 of the supplementary diaphragm 20 and the opposite end 24 is preferably formed to be engaged by an overlying inwardly extending annular flange 25 of a retaining cap 26. The cap 26 has skirt portion 27 of an inner diameter corresponding with the outer diameter of the spacing and clamping rings and has an internally threaded portion 28 engaging the threaded end 4 of the body member 2 as shown in Fig. 1 to secure the clamping and spacer rings in leak-tight engagement with the marginal portions of the diaphragms. When the parts are assembled the spacer ring 17 provides an enclosed or space chamber 29 between the respective diaphragms as shown in Fig. 1.

The frangible diaphragms are formed of any suitable sheet-like material having a strength and thickness, that when shaped retains the normal working pressures within the vessel but which fractures when the pressure differentials exceed a calculated pressure for which the diaphragms are designed.

As above pointed out, the primary diaphragm 12 is subject to deterioration, particularly when restraining corrosive fluids; consequently, pin holes and cracks may develop therein. These defects however are hidden by the supplementary diaphragm 20 with the result that no warning is given as to the condition of the primary diaphragm.

In accordance with the present invention, the supplementary diaphragm 20 is provided with a weep hole 30 to allow slow leakage of any fluid that escapes through the primary diaphragm 12 into the space 29 so as to give warning that the primary diaphragm 12 is defective either by the visible evidence of the leaking fluid or by the odor thereof as when the safety device is holding odorous fluids.

If desired, the opening 31 encircled by the inwardly extending flange 25 of the cap may be loosely covered by a plate 32 having one side lightly tacked to the flange of the cap by a spot weld as indicated at 33 while the major portion loosely engages over the flange to provide easy outlet for any fluid escaping through the weep hole 30 of the supplementary diaphragm 20.

Figure 3:
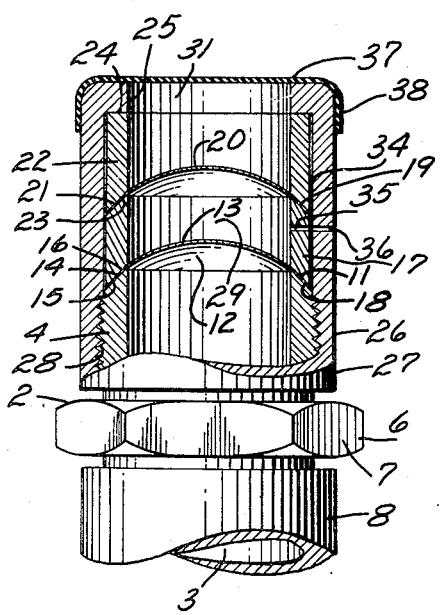
Fig. 3 is a section similar to Fig. 1 but showing a further modification of the invention.

The safety device shown in Fig. 3 follows the construction of the parts shown in Fig. 1 with the exception that the exterior diameter of the spacing ring 17 is slightly less than the inner diameter of the skirt 27 for the cap 26 to provide an annular space 34 therebetween and the spacer ring 17 is provided with a port 35 connecting the space 29 with the annular space 34 while the wall of the cap is provided with a similar port 36 to allow noticeable leakage of fluid that may escape into the space 29 because of defects or deterioration of the primary diaphragm 12. In this form of the invention the opening 31 of the cap 26 may be loosely closed by a cover 37 having a flange 38 extending over the cap 26 as shown. The cover may be formed of any suitable material; for example, rubber or other resilient non-metallic composition material.

In assembling the safety device constructed as shown in Fig. 1, the clamping ring 22 is inserted within the cap 26 to engage the flange 25. The convex side of the supplementary diaphragm 20 is then inserted, followed by the spacer ring 17 and the primary diaphragm 12. The body member or nipple 2 is then turned into the threads of the cap 26 so that the threads draw the parts into clamping engagement. The entire unit may then be applied to the vessel 10 to be protected by turning the threaded end of the body member 2 into the collar 8 or other relief opening in the device to be protected.

The form of the invention shown in Fig. 3 is assembled and installed in a similar manner.

In operation should the retained fluid leak through the primary diaphragm 12 because of corrosion or for some other reason the fluid will escape through the weep hole 30 and warn of the defectiveness of the primary diaphragm. Another unit may then be installed or the parts of the unit disassembled to remove the diaphragms and permit their replacement. When an excessive pressure differential occurs in the vessel 10 the primary diaphragm 12 will rupture at the pressure for which it was designed which results in rupture of the supplementary diaphragm 20 and blowing off of the cover plate 32, which actions establish a continuous flow passageway for immediate relief of the vessel.

The form of the invention shown in Fig. 3 operates in a similar manner with the exception that deterioration of the primary diaphragm is noted by fluid that leaks through the ports 35 and 36. When excessive pressure differentials occur, the diaphragms fracture responsive to that pressure and the protective covering 37 blows off to establish a clear flow opening from the vessel.

What we claim and desire to secure by Letters Patent is:

1. A safety device including a tubular member having an annular seat at one end encircling an axial opening extending through said member and having an exterior connection means, a diaphragm having a marginal portion engaging the annular seat, a spacing ring having a clamping face at one end engaging over said marginal portion of the diaphragm and having an annular seat at the other end, a supplementary diaphragm engaging said last named seat, a clamping ring having a clamping face engaging the marginal portion of the last named diaphragm, said seats and clamping faces being extended one within the other when engaged with the marginal portions of the diaphragms to maintain coaxial alignment of said rings and diaphragms with the tubular member, and a cap having a cylindrical wall loosely encircling the spacing and clamping rings and having an inturned flange engaging over the clamping ring, said cap having a connection means engaging with the connection means of the tubular member to effect clamping action on the diaphragms through said rings when the cap is applied to said tubular member.

2. A safety device including a tubular member having an annular seat at one end encircling an axial opening extending through said member and having an exterior connection means, a diaphragm having a marginal portion engaging the annular seat, a spacing ring having a clamping face at one end engaging over said marginal portion of the diaphragm and having an annular seat at the other end, a supplementary diaphragm having a marginal portion engaging said last named seat, said marginal portions of the diaphragm being outwardly flaring, a clamping ring having a clamping face engaging the marginal portion of the last named diaphragm, said seats and clamping faces being tapered to conform with the flaring marginal portions of the diaphragms to extend one within the other when engaged with the marginal portions of the diaphragms to maintain coaxial alignment of said rings and diaphragms in stacked relation on the tubular member and a cap having a cylindrical wall loosely encircling the spacing and clamping rings and having an inturned flange engaging over the clamping ring, said cap having a connection means engaging with the connection means of the tubular member to effect clamping action on the flaring marginal portions of the diaphragms through said rings when the cap is applied to said tubular member.

3. A safety device including a tubular member having an annular seat at one end encircling an axial opening extending through said member and having an exterior connection means, a primary diaphragm having a marginal portion engaging the annular seat, a spacing ring having a clamping face at one end engaging over said marginal portion of the primary diaphragm and having an annular seat at the other end, a supplementary diaphragm engaging said last named seat and cooperating with the spacing ring and said last named seat to form a chamber between said diaphragms, a clamping ring having a clamping face engaging the marginal portion of the last named diaphragm, said seats and clamping faces being extended one within the other when engaged with the marginal portions of the diaphragms to maintain said rings and diaphragms in coaxial stacked relation on the tubular member and a cap having a cylindrical wall loosely encircling the spacing and clamping rings and having an inturned flange engaging over the clamping ring, said cap having a connection means engaging with the connection means of the tubular member to effect clamping action on the diaphragms through said rings when the cap is applied to said tubular member, and said chamber having a vent to indicate any leakage of the primary diaphragm.

4. A safety device including a tubular member having an annular seat at one end encircling an axial opening extending through said member and having an exterior connection means, a primary diaphragm having a marginal portion engaging the annular seat, a spacing ring having a clamping face at one end engaging over said marginal portion of the diaphragm and having an annular seat at the other end, a supplementary diaphragm having a marginal portion engaging said last named seat and cooperating with the primary diaphragm to form a chamber therebetween, said marginal portions of the diaphragm being outwardly flaring, a clamping ring having a clamping face engaging the marginal portion of the last named diaphragm, said seats and clamping faces being tapered to conform with the flaring marginal portions of the diaphragm to extend one within the other when engaged with the marginal portions of the diaphragms to maintain coaxial alignment of said rings and diaphragms in stacked relation on the tubular member and a cap having a cylindrical wall loosely encircling the spacing and clamping rings and having an inturned flange engaging over the clamping ring, said cap having a connection means engaging with the connection means of the tubular member to effect clamping action on the flaring marginal portions of the diaphragms through said rings when the cap is applied to said tubular member, and said chamber having vent means for indicating any leak in the primary diaphragm.

ROBERT S. COFFMAN.
HOWARD N. SIMMS.

References Cited in the file of this patent

UNITED STATES PATENTS

| Number | Name | Date |
|---|---|---|
| 568,680 | Henderson | Sept. 29, 1896 |
| 1,584,523 | Egbert | May 11, 1926 |
| 2,526,794 | Andrews | Oct. 24, 1950 |
| 2,536,321 | Smith | Jan. 2, 1951 |
| 2,571,961 | Smith | Oct. 16, 1951 |
| 2,576,431 | White | Nov. 27, 1951 |